Aug. 9, 1949.  W. A. HASBANY  2,478,869
TRANSMISSION
Original Filed June 21, 1946
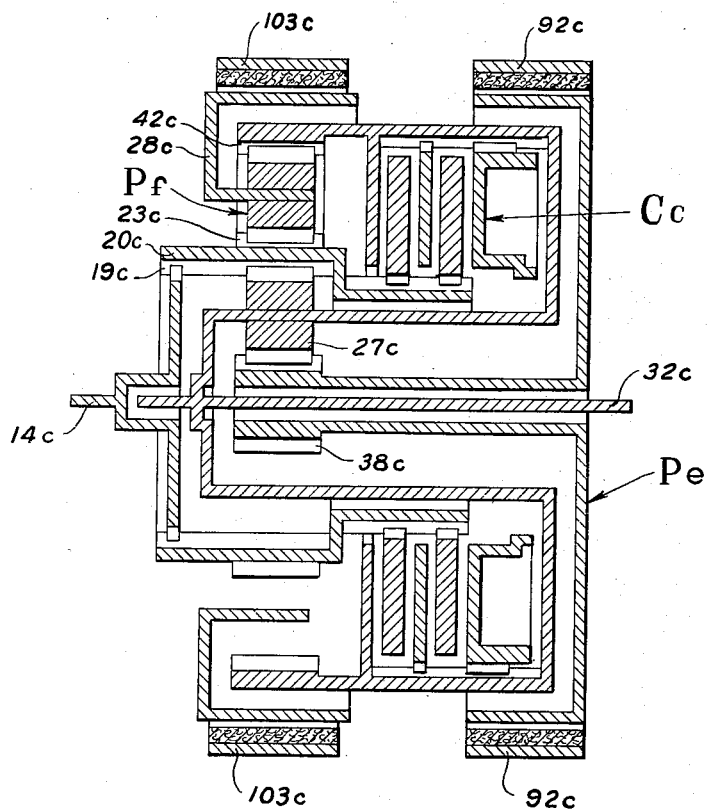
INVENTOR.
BY Woodrow A. Hasbany
Brown, Jackson, Boettcher & Dienner.
ATTORNEYS Patented Aug. 9, 1949

2,478,869

UNITED STATES PATENT OFFICE 2,478,869

TRANSMISSION

Woodrow A. Hasbany, South Bend, Ind., assignor to The Studebaker Corporation, South Bend, Ind., a corporation of Delaware Original application June 21, 1946, Serial No. 678,449. Divided and this application July 10, 1948, Serial No. 38,023

6 Claims. (Cl. 74—763)

My present invention relates to an improvement in transmissions, and more particularly to transmissions of the planetary or epicyclic gear type providing a plurality of gear ratios for forward drive and reverse drive.

My present application is a division of my application, Serial No. 678,449, filed June 21, 1946.

Planetary gear mechanisms have come into use in constructing automatic or semi-automatic transmissions for automotive vehicles largely because of the ease with which they may be controlled to effect changes in gear ratio. These automatic or semi-automatic transmissions usually comprise a fluid torque convertor unit which, as is known, provide infinitely variable torque multiplication automatically, and which when used in conjunction with a planetary gear mechanism provides a form of transmission particularly adaptable for use in obtaining desired forward gear ratios for an automotive vehicle. In such types of transmissions it has been proposed to provide a second planetary or epicyclic gear mechanism which is adapted to be actuated to provide for reverse drive. For example, a pair of planetary gear mechanisms may be arranged so that one of the planetary gear mechanisms provides either ratio or direct forward drive therethrough, when the second of the planetary gear mechanisms is locked up, and which latter planetary gear mechanism when one of the elements thereof is caused to be held against rotation, is adapted to effect a reverse drive.

In the co-pending application of Harold E. Churchill, Paul V. Haigh and Harold O. Zander, Serial No. 644,828, filed February 1, 1946, there is disclosed a transmission of a type last referred to. In the transmission of that application a planetary gear mechanism is provided for effecting reverse drive which has associated therewith positive jaw clutch and brake means for clutching two of the elements together for conjoint rotation for forward drive and for braking of one of the elements of the mechanism to effect reverse drive. However, it is found that the selective actuation of a planetary gear mechanism as by positive jaw clutch and brake means to effect forward or reverse drive therethrough is not entirely satisfactory in that it is difficult to engage and disengage the positive jaw clutch and brake teeth as smoothly as is desired in the operation of an automotive vehicle.

It is an object of my present invention to provide a transmission comprising a plurality of planetary gear mechanisms having a common member forming an element of each thereof and arranged with respect to each other so that one of the planetary gear mechanisms is adapted to be controlled to provide selected forward drive ratios with another of the planetary gear mechanisms being adapted to be controlled to effect reverse drive.

A further object of my invention is to provide an arrangement of a pair of planetary gear mechanisms each comprising three elements, namely, a sun gear, planet pinion means, and a ring gear, in which a common member forms one of the elements of each of the planetary gear mechanisms and with suitable brake and clutch means being associated with the planetary gear mechanisms operable for effecting selected forward drive ratios therethrough and for effecting reverse drive.

A still further object is to provide a transmission as aforesaid having drive and driven shafts in which the pair of planetary gear mechanisms each have one of the elements thereof formed as a common integral member extending therebetween with a pair of the elements of one planetary gear mechanism having connection one each with the drive and driven shafts, and in which brake and clutch means are arranged with respect to certain of the elements of the planetary gear mechanisms to provide a plurality of forward drive ratios to the driven shaft and a reverse drive to the driven shaft.

I propose to achieve the aforesaid objects by providing a transmission comprising a first planetary gear mechanism having a first sun gear, first planet pinion means, and a first ring gear, and a second planetary gear mechanism comprising a second sun gear, second planet pinion means and a second ring gear. In the preferred embodiment of my invention herein disclosed the drive shaft for the transmission has driving connection with the first ring gear and the driven shaft has driving connection with the planet arm or carrier of the first planet pinion means. The arrangement further is such that the first ring gear is formed integrally with the second sun gear. In such a relationship of parts I propose to provide a first brake means selectively operable for holding the first sun gear against rotation for effecting low ratio drive through the first planetary gear mechanisms and which when the first brake means is applied the second planetary gear mechanism idly rotates without transmitting any torque.

The transmission further embodies a clutch means preferably of the disc type between two of the elements of the first planetary gear mechanism so that when this clutch is actuated with the first brake means referred to being released direct drive in the forward direction is adapted to be transmitted through the first planetary gear mechanism from the drive to the driven shaft of the transmission. The transmission further comprises a second brake means associated with the planet arm of the second planet pinion means of the second planetary gear mechanism, which second brake means is selectively operable for holding the second planet pinion means against rotation and which when the second brake means is caused to be actuated with the first brake means and the clutch means disengaged effects reverse drive through the planet pinion means of the first planetary gear mechanism to the driven shaft of the transmission.

A preferred feature of the embodiment of my invention herein disclosed resides in an arrangement wherein the first and second planetary gear mechanisms are disposed coaxially and concentrically of a common axis of the drive and driven shafts and in which the ring gear of the first planetary gear mechanism is formed integrally with the sun gear of the second planetary gear mechanism, in which the planet pinion means of the first planetary gear mechanism is connected with the ring gear of the second planetary gear mechanism, and in which a single clutch means is arranged between the integrally formed sun and ring gears of the first and second planetary gear mechanism, respectively, on the one hand, and the connected planet pinion means and ring gear of the first and second planetary gear mechanism, respectively, on the other hand.

The above and other objects and advantages of my invention will appear from the detail description.

Now in order to acquaint those skilled in the art with the manner of constructing and utilizing transmission in accordance with my present invention, I shall describe, in connection with the accompanying drawings, certain preferred embodiments of my invention.

The single figure of the drawing illustrates diagrammatically a transmission embodying my present invention.

In the transmission shown in the drawing, a pair of planetary gear mechanisms P$_e$ and P$_r$ are arranged concentrically and co-axially of the common axis of the drive and driven shafts 14c and 32c, respectively. The pair of planetary gear mechanisms comprise the common member 20c therebetween, and is formed with internal ring gear teeth 19c for the first planetary gear mechanisms P$_e$ and external sun gear teeth 23c for the planetary gear mechanism P$_r$. The planet carrier member 28c is formed with a brake drum portion extending co-axial of and overlying the ring gear member 42c of the planetary gear mechanism P$_r$. A disc clutch C$_c$ is arranged between the ring gear member 19c and the planet pinions 27c with the planet carrier arm of the planetary gear mechanism P$_e$ being connected with the ring gear member 42c of the planetary gear mechanism P$_r$. Low ratio drive is adapted to be effected between the drive and driven shafts by engagement of the brake means 92c to hold the sun gear 38c of the planetary gear mechanism P$_e$ against rotation with the brake means 103c and the clutch means C$_c$ being disengaged. In order to effect direct drive from the drive shaft 14c to the driven shaft 32c the clutch means C$_c$ is caused to be engaged to lock the ring gear member with the planet pinion means of the planetary gear mechanism P$_e$ with, of course, the brake means 92c and 103c being disengaged. In order to effect reverse drive from the drive shaft 14c to the driven shaft 32c the brake means 103c is caused to be actuated with the clutch means C$_c$ and the brake means 92c disengaged which is effective to hold the planet carrier of the planet pinion means of the planetary gear mechanism P$_r$ against rotation effecting rotation of the ring gear 42c of the latter planetary gear mechanism in a direction opposite the direction of rotation of the common ring gear and sun gear element 20c of the planetary gear mechanisms P$_e$ and P$_r$, respectively, and providing through the planet pinion carrier means of the planetary gear mechanism P$_e$ reverse ratio drive of the driven shaft 32c.

While I have shown what I consider to be e preferred embodiment of my invention, it will be understood that various modifications and rearrangements may be made therein without departing from the spirit and scope of my invention.

I claim:

1. A transmission having co-axially extending drive and driven shafts comprising, a first planetary gear mechanism disposed co-axially of the axis of said shafts and having three elements, namely, first sun gear, first planet pinion means and a first ring gear, said first sun gear having a first brake drum member associated therewith and spaced lengthwise therefrom along said axis, a second planetary gear mechanism disposed co-axially of said axis and concentrically of said first planetary gear mechanism and having three elements, namely, a second sun gear, second planet pinion means, and a second ring gear, said first ring gear and said second sun gear being integral, said second planet pinion means having a second brake drum member disposed co-axially of said axis and concentrically of said second ring gear, and clutch means disposed co-axially of said axis between said first and second brake drum members and associated with said second ring gear and said first planet pinion means, and said first ring gear and said second sun gear.

2. A transmission having co-axially extending drive and driven shafts comprising, a first planetary gear mechanism disposed co-axially of the axis of said shafts and having three elements, namely, a first sun gear, first planet pinion means and a first ring gear, said first sun gear having a first brake drum member associated therewith and spaced lengthwise therefrom along said axis, a second planetary gear mechanism disposed co-axially of said axis and concentrically of said first planetary gear mechanism and having three elements, namely, a second sun gear, second planet pinion means, and a second ring gear, said first ring gear and said second sun gear being integral, said first planet pinion means being connected with said second ring gear, said second planet pinion means having a second brake drum member disposed co-axially of said axis and concentrically of said second ring gear, and clutch means disposed co-axially of said axis between said first and second brake drum members and associated with said second ring gear and said first planet pinion means, and said first ring gear and said second sun gear.

3. A transmission having co-axially extending drive and driven shafts comprising a first planetary gear mechanism having three elements, namely, a first sun gear, first planet pinion means, and a first ring gear, said first ring gear being connected with said drive shaft, said first planet pinion means being connected with said driven shaft, a second planetary gear mechanism disposed co-axially of the axis of said drive and driven shafts and concentrically of said first planetary gear mechanism and having three elements, namely, a second sun gear, second planet pinion means, and a second ring gear, said first ring gear and said second sun gear being integral, said first planet pinion means being connected with said second ring gear, first brake means associated with said first sun gear, second brake means associated with said second planet pinion means, and clutch means associated with said second ring gear and said first planet pinion means, and said first ring gear and said second sun gear.

4. A transmission having co-axially extending drive and driven shafts comprising a first planetary gear mechanism having three elements, namely, a first sun gear, first planet pinion means, and a first ring gear, said first ring gear being connected with said drive shaft, said first planet pinion means being connected with said driven shaft, a second planetary gear mechanism disposed co-axially of the axis of said drive and driven shafts and concentrically of said first planetary gear mechanism and having three elements, namely, a second sun gear, second planet pinion means, and a second ring gear, said first ring gear and said second sun gear being integral, said first planet pinion means being connected with said second ring gear, and clutch means associated with said second ring gear and said first planet pinion means, and said first ring gear and said second sun gear.

5. A transmission having co-axially extending drive and driven shafts comprising a first planetary gear mechanism having three elements, namely, a first sun gear, first planet pinion means, and a first ring gear, said first ring gear being connected with said drive shaft, said first planet pinion means being connected with said driven shaft, a second planetary gear mechanism disposed co-axially of the axis of said drive and driven shafts and concentrically of said first planetary gear mechanism and having three elements, namely, a second sun gear, second planet pinion means, and a second ring gear, said first ring gear and said second sun gear being integral, said first planet pinion means being connected with said second ring gear, brake means associated with said first sun gear, and clutch means associated with said second ring gear and said first planet pinion means, and said first ring gear and said second sun gear.

6. A transmission having co-axially extending drive and driven shafts comprising a first planetary gear mechanism having three elements, namely, a first sun gear, first planet pinion means, and a first ring gear, said first ring gear being connected with said drive shaft, said first planet pinion means being connected with said driven shaft, a second planetary gear mechanism disposed co-axially of the axis of said drive and driven shafts and concentrically of said first planetary gear mechanism and having three elements, namely, a second sun gear, second planet pinion means, and a second ring gear, said first ring gear and said second sun gear being integral, said first planet pinion means being connected with said second ring gear, brake means associated with said second planet pinion means, and clutch means associated with said second ring gear and said first planet pinion means, and said first ring gear and said second sun gear.

WOODROW A. HASBANY.

No references cited.